June 28, 1932.  N. J. LEAVY  1,865,023
BOTTLE CLOSURE AND SEDIMENT TRAP
Filed March 5, 1930
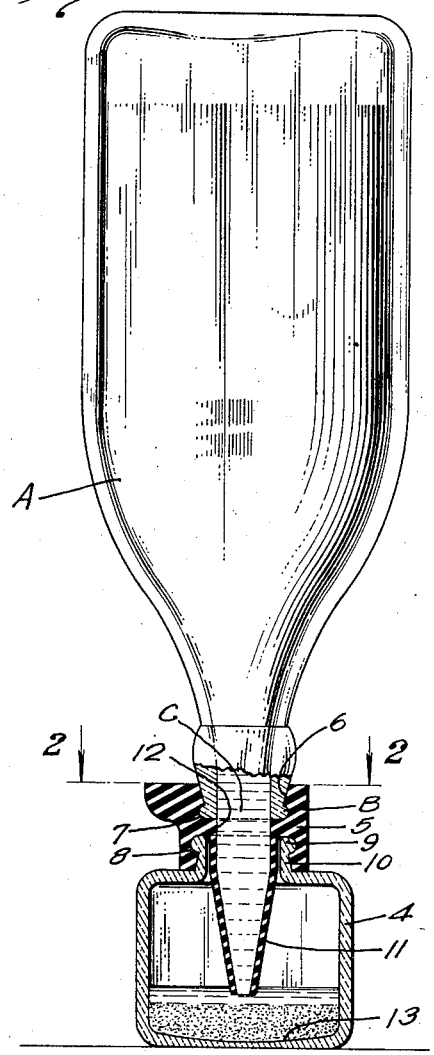
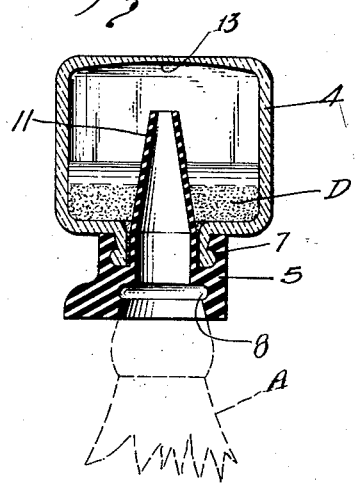
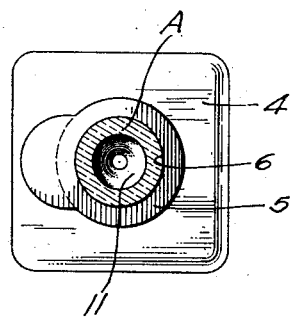
INVENTOR.
Nathan J. Leavy
BY
ATTORNEYS.

Patented June 28, 1932

1,865,023

UNITED STATES PATENT OFFICE

NATHAN J. LEAVY, OF LOS ANGELES, CALIFORNIA

BOTTLE CLOSURE AND SEDIMENT TRAP

Application filed March 5, 1930. Serial No. 433,304.

This invention relates to bottle closures and sediment traps, and an object of the invention is the clarifying of bottled beverages and other liquids. In the making of root beer, fruit juices and many other beverages, bottling of the beverages is effected soon after manufacture to exclude air from the beverage. Ordinarily, the bottles are capped with a metal cap, which is allowed to remain until it is desired to consume the beverage. Any solids that remain in the liquid make it cloudy, and the substances that may be employed in the production of a beverage or other liquid product are often not entirely removed, even though the liquid be strained, and the solid matter produces a cloudy liquid when the bottles are opened and the contents poured out into a glass. When the bottles stand, the solids settle to the bottom, but in pouring off the liquid the solids pass out with the liquid into the glass.

It is an important object of this invention to trap these solids as they settle so that when the beverage is poured from the bottles, it will be clear.

Other objects are simplicity of construction and ease with which the invention may be employed to accomplish its purpose.

Other objects and advantages will appear in the subjoined detailed description.

The accompanying drawing illustrates the invention:

Figure 1 is a vertical section of a bottle closure and sediment trap constructed in accordance with the provisions of this invention, the same being shown applied to a bottle, which is mainly shown in elevation.

Fig. 2 is a plan view, partly in section, from the line indicated by 2—2, Fig. 1.

Fig. 3 is a sectional view of a bottle closure and sediment trap inverted from the position shown in Fig. 1, the bottle being fragmentarily indicated in broken lines.

Referring to the drawing, a bottle with which the invention may be employed is indicated at A, and there is provided a sediment cup 4. An important feature of the invention is the construction of a coupling 5 by which the bottle A and the sediment cup 4 are connected. The coupling 5 is constructed of resilient material, such as rubber, and the bore 6 has a pair of annular grooves 7, 8. The groove 7 is adapted to fit the bead B with which the bottle A is usually provided for capping purposes. The groove 8 closely fits a bead 9 on the neck 10 of the cup 4.

When the bottle A and cup 4 are coupled together, as indicated in Fig. 1, leakage of liquid from the bottle cannot occur, nor can air enter the liquid. Within the bore of the coupling 5 is a tube 11 which may be of any suitable material, for example, said tube may be of rubber and, as shown in the drawing, it may be of integral construction with the coupling 5. When of such construction, said tube is connected with the coupling at a reduced bore portion 12 of said coupling. In placing the coupling 5 on the neck 10, said neck will be accommodated between the coupling 5 and the tube 11.

It may be preferable to taper the tube 11 so that said tube is reduced in diameter toward that end that is farthest from the coupling. The bore of the tube 11 is approximately alined with the opening C in the neck of the bottle and the tube 11 projects outside of the coupling 5 and into the cup 4. That end of the tube that projects into the cup 4 is spaced from the bottom of the cup 4 so that when the bottle is in the position shown in Fig. 1 liquid and sediment can pass out of the tube 11 into the cup.

It is desirable to make the inner face of the bottom of the cup 4 concave, as shown at 13, so that when the bottle is turned from the inverted position shown in Fig. 1 into the upright position shown in Fig. 3, the sediment that has been caught in the cup 4 will flow toward one side of the cup and thus be prevented from falling back into the bottle A through the tube 11.

The invention described above operates as follows: after the bottle has been filled with a manufactured beverage, such as malt beer, root beer, ginger ale, or the like, the coupling 5 will be applied to the neck of the bottle, while said bottle is turned upright, and then the neck of the cup 4 will be inserted in the coupling 5, so that the assembly is as illustrated in Fig. 3.

The bottle will then be inverted, as shown in Fig. 1, so that the bottle is supported by the cup 4. As the solids that may be in the beverage gravitate downwardly in the liquid in the bottle A, said solids pass through the tube 11 into the cup 4. When the liquid has cleared to the desired degree or when it is desired to use the beverage, the bottle is turned from the position shown in Fig. 1 to that shown in Fig. 2, and this causes the solids to flow to that side of the cup 4 that is lowest, and said solids will collect in the space between the peripheral wall of the cup and the tube 11, thus trapping said solids which are indicated at D. To open the bottle, the coupling 5, together with the cup 4, will be removed from the bottle and the clear beverage will then be poured from the bottle. The trap cup will be removed from the coupling and cleansed and it is then again ready for use with another bottle of beverage.

It is to be noted that if the bottled product is one in which gas is liberated so as to increase the pressure within the bottle and cup above atmospheric pressure, the internal pressure will tend to push the cup and bottle away from each other, thus pressing the beads into closer fit with the walls of the coupling grooves, thereby insuring against leakage of the gas.

It is to be understood that the term bottle herein employed defines a container of any suitable character and that such container may be constructed of any suitable material.

I claim:

1. A bottle closure and sediment trap comprising a cup, a resilient coupling to seal the cup to the neck of a bottle and provided with a bore, and a tube in said bore projecting into the cup.

2. A bottle closure and sediment trap comprising a cup, a means to seal the cup to the neck of a bottle, said means provided with a bore, and a tube projecting from said bore into the cup.

3. As an article of manufacture, a combined bottle stopper and sediment cup comprising a cup having a neck of approximately the same dimensions as the neck of the bottle to be stoppered, a rubber joining member having a passage therethrough for engaging the necks on a bottle to be stoppered and of said cup whereby said necks are held in juxtaposed relation to each other, and a tube secured to and forming a part of said joining member for extending said passage to a point within said cup, thereby preventing return of sediment from said cup to said bottle when said bottle is returned from inverted to normal position.

Signed at Los Angeles, California, this 25th day of February, 1930.

NATHAN J. LEAVY.